July 18, 1939.  W. F. SCHMALZ  2,166,879

ORNAMENTED ARTICLE AND METHOD OF MAKING

Filed July 15, 1936

Inventor
William F. Schmalz
By S. Jay Teller
Attorney

Patented July 18, 1939

2,166,879

UNITED STATES PATENT OFFICE 2,166,879

ORNAMENTED ARTICLE AND METHOD OF MAKING

William F. Schmalz, Rockville, Conn., assignor to Colt's Patent Fire Arms Manufacturing Co., Hartford, Conn., a corporation of Connecticut Application July 15, 1936, Serial No. 90,640

8 Claims. (Cl. 18—59)

The invention relates particularly to an ornamented article wherein the main body consists of a molded material and wherein the ornamentation is obtained by means of a thin metallic insert around which the molded material is molded so as to leave the front face of the insert exposed.

One object of the inventoin is to provide an ornamented article of the type described wherein the ornamental insert is accurately located with respect to the periphery or contour of the article and wherein the said insert is securely held by the molded material so that it cannot be readily loosened and peeled off.

Another object is to provide an ornamental insert adapted to be imbedded within a molded body during the molding thereof and which is so formed as to be positively and accurately positioned within the mold while the body is being molded therearound.

A further object of the invention is to provide a simple and inexpensive method whereby ornamented articles having the advantages last above described can be made.

The accompanying drawing illustrates one form of article embodying the invention and also diagrammatically illustrates the steps of the method. It will be understood that the drawing is intended for illustrative purposes only and is not to be construed as confining or limiting the scope of the invention, the claims forming a part of this specification being relied upon for that purpose.

Figure 1:
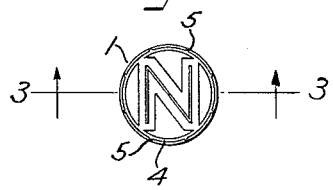
Figs. 1 and 2 are front and side views respectively of an article embodying the invention.

Referring to the drawing, 1 represents as an entirety an ornamented article embodying the invention. As shown, the article is a simple disc or button circular in shape; but it will be understood that the invention is not so limited, as the article may be square or hexagonal or may have any other shape or contour. The ornamentation is shown as being in the form of a letter or initial; but it will be understood that the invention is not so limited, as the ornamentation may be widely varied in form.

Figure 3:
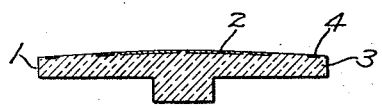
Fig. 3 is an enlarged sectional view taken along the line 3—3 of Fig. 1.
Figure 7:
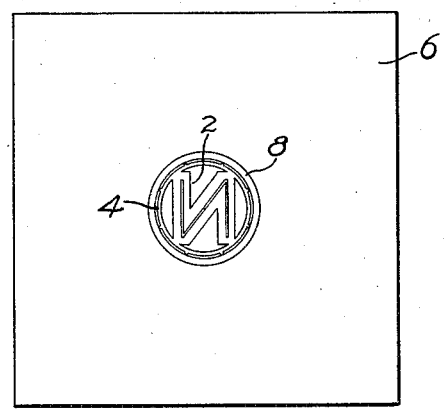
Fig. 7 is a plan view of the lower unit of the mold, this view showing an ornamental insert in place.

The ornamentation is provided by means of an insert 2 which is formed of sheet metal. The insert is preferably very thin, approximately .005" being a suitable thickness. Whatever may be the form of the ornamentation, there is preferably, though not necessarily, provided an outer border or frame having a contour which conforms approximately to the outer contour of the article 1 but is slightly smaller. In the example shown the letter or initial "N" is enclosed in a circular border or frame 4 having its outer diameter slightly smaller than the diameter of the disc or button 1. As the result of the smaller outer contour of the insert 2, a portion of the material forming the main body 3 of the article extends around the edges of the insert forming an annular or peripheral border. It will be observed particularly from an inspection of Fig. 3 that the front of the article is smooth, the front surface of the body 3 being flush with the front surface of the insert 2.

Figure 4:
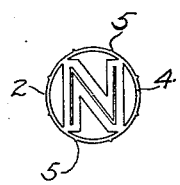
Figs. 4 and 5 are front and side views respectively of the ornamental insert forming a part of the article ilustrated in Figs. 1, 2 and 3.
Figure 5:
Figure 8:
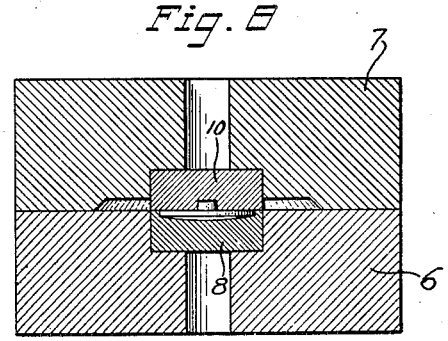
Fig. 8 is a view of Fig. 6 showing the mold closed, this view illustrating the final step of the method.

As will be apparent from an inspection of Figs. 1 and 4, the sheet metal insert 2 is provided with a plurality of integral projections 5, 5 which are spaced apart and which project outward beyond the main outer contour of the insert. The projections 5, 5 are short and terminate at their outer ends at the edges of the molded body; and the said projections 5, 5 are narrow, preferably being tapered to points at their outer ends. The function of the projections 5, 5 will be more readily understood from a consideration of the method of making the article which method will now be described.

Figure 6:
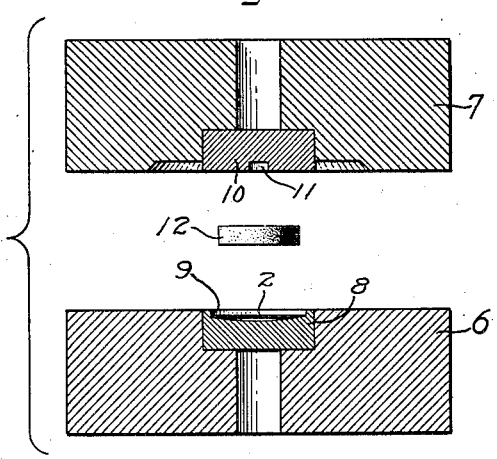
Fig. 6 is a diagrammatic view of a mold such as may be used in the practice of the method of the invention, this view illustrating the first step of the method.
Figure 2:

Fig. 6 shows diagrammatically the lower and upper sections 6 and 7 of a mold adapted to be used in molding the article 1. The lower mold section 6 carries a hardened insert 8 in which is a recess 9 conforming in diameter and depth to the desired size and shape of the article to be molded. The upper mold section 7 carries a hardened insert 10, the lower face of which conforms to the back face of the article 1 to be molded. As shown, there is a small recess 11 adapted for forming a short shank on the rear of the article.

With the mold sections separated from each other, a metallic insert 2 is placed in the recess 9 in reversed position, that is, with the front of the insert facing downward. Inasmuch as the projections 5, 5 are of such length as to terminate at their outer ends at the edges of the molded body, they are of such length as to engage with the walls of the recess 9 and to thus serve to accurately locate or center the insert in the recess. After the insert 2 has been put in place as described, the required quantity of moldable material is placed in the recess. I do not closely limit myself as to the character of the moldable material, but I prefer to use a synthetic resin such as phenolic condensation compound. The moldable material is conveniently provided in the form of a pressed briquet such as indicated at 12 in Fig. 6. When such a briquet is used it is placed in the recess 9 on top of the insert 2. Thereupon the mold is closed, the upper mold section 7 being brought into engagement with the lower mold section 6 under suitable pressure. The mold sections 6 and 7 are heated in accordance with usual practice, and thus the moldable material is heated while being molded. By reason of the closing of the mold under pressure and the simultaneous heating of the moldable material, the said material is molded around the back and edges of the insert 2 leaving the front face thereof exposed as clearly shown in Figs. 1 and 3.

The spaced projections 5, 5 serve, as already stated, to accurately locate and center the insert in the recess of the mold and they therefore serve to insure the accurate centering of the insert with respect to the outer contour of the finished article. It will be seen that there is a narrow border of molded material around the main contour of the insert. This border of molded material not only improves the ornamental effect but has the practical advantage that it covers and protects the edges of the insert thus making it impossible for the insert to be engaged, accidentally or otherwise, in such a way that the insert can be loosened and peeled off. The small points on the projections 5, 5 are too narrow to be readily engaged and furthermore each of them is securely held by the molded material at each of its edges. Without the border of molded material surrounding the insert, the latter could in many instances be readily loosened and removed. Removal would be more readily possible by reason of the fact that the molded material would shrink upon cooling after molding, thus leaving the edges of the insert projecting to a slight extent.

It will be apparent to those skilled in the art that one of the basic concepts of the invention is to form the ornamental insert and the body with such relative shapes and sizes that in the finished article there is a border of body material molded around the edge of the insert except at the ends of a plurality of substantially pointed portions of the insert, which ends are at the edge of the body.

What I claim is:

1. In an article of the class described, the combination of an ornamental insert which includes a plurality of integral substantially pointed portions, and a body molded around said insert at the back and edges thereof but leaving the front face exposed, said body being of such size and contour that there is a border of molded material around said insert except at the ends of said substantially pointed portions which are at the edge of the body.

2. In an article of the class described, the combination of an ornamental insert which includes at least three triangularly related integral substantially pointed portions, and a body molded around said insert at the back and edges thereof but leaving the front face exposed, said body being of such size and contour that there is a border of molded material around said insert except at the ends of said substantially pointed portions which are at the edge of the body.

3. In an article of the class described, the combination of an ornamental insert which includes a main design portion and a plurality of spaced apart integral projections extending outward from the edge of said main design portion, and a body molded around said insert at the back and edges thereof but leaving the front face exposed, said body being of such size and contour that there is a border of molded material around the main design portion of the insert but the ends of said projections are at the edges of the body.

4. In an article of the class described, the combination of an ornamental insert formed of sheet metal and having a plurality of integral projections which are spaced apart and which project outward beyond the main outer contour of the insert, and a body molded around the insert at the back and at the edges thereof but leaving the front face thereof exposed, the said body having its outer contour approximately conforming to the main contour of the insert but slightly larger so that there is a border of molded material around the main contour of the insert and so that the outer ends of the projections on the insert are at the edges of the body.

5. An ornamental insert adapted to have a body molded therearound, comprising a main design portion, and a plurality of spaced apart integral projections extending outward from the edge of said main design portion, said projections being adapted to engage the side wall of a mold to center the insert with respect to the mold.

6. An ornamental insert of substantially uniform thickness and adapted to have a body molded therearound, comprising a design portion, and an integral frame surrounding said design portion, said frame including a plurality of substantially pointed portions adapted to engage the side wall of a mold to center the insert with respect to the mold.

7. The herein described method of making an article of the class described, comprising providing a mold having a recess therein conforming in contour to the contour of the article to be made, placing in the recess an ornamental insert generally smaller than the recess but having a plurality of integral substantially pointed portions which are spaced apart and engage the sides of the recess to thereby positively and accurately locate the insert therein, placing the required quantity of moldable material in the recess, and pressing the material to mold the same around the back and around the edges of the insert not in engagement with said walls but leaving the front face thereof exposed.

8. The herein described method of making an article of the class described, which consists in providing a mold having a recess conforming in contour to the contour of the article to be made, placing in the recess an ornamental insert formed of sheet metal and having its main contour conforming approximately to the contour of the recess but slightly smaller, the said insert having a plurality of short and narrow integral projections which are spaced apart and which extend outward beyond the main contour of the insert to engage the sides of the recess and to thereby centrally locate the insert therein, placing the required quantity of moldable material in the recess, and pressing the material to mold the same around the insert at the back and edges thereof but leaving the front face thereof exposed.

WILLIAM F. SCHMALZ.